(12) United States Patent
Silvestre et al.

(10) Patent No.: US 12,731,140 B2
(45) Date of Patent: Sep. 8, 2026

(54) SYSTEMS AND METHODS FOR VALIDATING TRANSMISSIONS OVER COMMUNICATION CHANNELS

(71) Applicant: American Express Travel Related Services Company, Inc., New York, NY (US)

(72) Inventors: Carlos Eduardo Oliveira do Valle Silvestre, East Sussex (GB); Jonathan Ward Lupton, West Sussex (GB)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 17/481,398

(22) Filed: Sep. 22, 2021

(65) Prior Publication Data

US 2022/0051244 A1 Feb. 17, 2022

Related U.S. Application Data

(63) Continuation of application No. 16/312,871, filed as application No. PCT/US2016/040803 on Jul. 1, 2016, now Pat. No. 11,151,561.

(51) Int. Cl.
*G06Q 20/40* (2012.01)
*G06Q 20/32* (2012.01)
(Continued)

(52) U.S. Cl.
CPC ....... *G06Q 20/401* (2013.01); *G06Q 20/3278* (2013.01); *G06Q 20/3823* (2013.01); *H04L 9/3242* (2013.01)

(58) Field of Classification Search
CPC ............. G06Q 20/401; G06Q 20/3278; G06Q 20/3823; H04L 9/3242
See application file for complete search history.

(56) References Cited

U.S. PATENT DOCUMENTS 7,478,434 B1 1/2009 Hinton et al.
7,596,530 B1 9/2009 Glasberg
(Continued)

FOREIGN PATENT DOCUMENTS

WO WO 99/64995 A1 12/1999
WO WO 99/67766 A2 12/1999
(Continued)

OTHER PUBLICATIONS

International Search Report and Written Opinion dated Sep. 16, 2016 in PCT Application No. PCT/US2016/040803.
(Continued)

*Primary Examiner* — Patrick Mcatee
*Assistant Examiner* — Vincent I Idiake
(74) *Attorney, Agent, or Firm* — STERNE, KESSLER, GOLDSTEIN & FOX P.L.L.C.

(57) ABSTRACT

An authentication system may receive an authentication MAC, an integrity MAC, and data transmitted from a payment application and a payment terminal. A local integrity MAC may be generated using the data as an input to a first cryptographic operation. The system may compare the local integrity MAC to the received integrity MAC to authenticate the received integrity MAC. A local authentication MAC may be generated using a second cryptographic operation and compare the local authentication MAC to the received authentication MAC. The system may authenticate the payment application in response to a successful authentication of at least one of the received authentication MAC or the received integrity MAC.

14 Claims, 4 Drawing Sheets

(51) Int. Cl.

| | |
|---|---|
| ***G06Q 20/38*** | (2012.01) |
| ***H04L 9/32*** | (2006.01) |

(56) References Cited

U.S. PATENT DOCUMENTS

| | | | | |
|---|---|---|---|---|
| 7,624,283 | B2 | 11/2009 | Bade et al. | |
| 10,565,570 | B2 * | 2/2020 | Chan | G06Q 40/06 |
| 2002/0095567 | A1 * | 7/2002 | Royer | H04L 63/168 713/150 |
| 2008/0120504 | A1 | 5/2008 | Kirkup et al. | |
| 2008/0301436 | A1 * | 12/2008 | Yao | H04L 9/3236 713/155 |
| 2008/0301461 | A1 | 12/2008 | Coulier et al. | |
| 2010/0228668 | A1 * | 9/2010 | Hogan | G06Q 20/02 705/41 |
| 2011/0258452 | A1 | 10/2011 | Coulier et al. | |
| 2012/0150742 | A1 | 6/2012 | Poon et al. | |
| 2013/0254117 | A1 | 9/2013 | von Mueller et al. | |
| 2014/0040628 | A1 | 2/2014 | Fort et al. | |
| 2014/0189335 | A1 | 7/2014 | Liu et al. | |
| 2014/0189359 | A1 | 7/2014 | Marien et al. | |
| 2015/0100497 | A1 | 4/2015 | de Jong et al. | |
| 2015/0112869 | A1 | 4/2015 | Radu et al. | |
| 2015/0170114 | A1 | 6/2015 | Klingen | |
| 2015/0170144 | A1 | 6/2015 | Palma Lizana et al. | |
| 2016/0180343 | A1 | 6/2016 | Poon et al. | |
| 2019/0172064 | A1 | 6/2019 | Silvestre et al. | |

FOREIGN PATENT DOCUMENTS

| | | | | |
|---|---|---|---|---|
| WO | WO-0199070 | A2 * | 12/2001 | G06Q 20/20 |
| WO | WO 2010/116310 | A1 | 10/2010 | |
| WO | WO 2015/063495 | A1 | 5/2015 | |
| WO | WO 2016/092318 | A1 | 6/2016 | |
| WO | WO 2017/012086 | A1 | 1/2017 | |
| WO | WO 2018/228732 | A1 | 12/2018 | |

OTHER PUBLICATIONS

International Preliminary Report on Patentability dated Jun. 1, 2017 in PCT Application No. PCT/US2016/040803.

* cited by examiner

SYSTEMS AND METHODS FOR VALIDATING TRANSMISSIONS OVER COMMUNICATION CHANNELS

CROSS-REFERENCE TO RELATED APPLICATIONS

This application is a continuation of U.S. application Ser. No. 16/312,871, filed on Dec. 21, 2018, which is a 35 U.S.C. § 371 National Phase Application of International Application No. PCT/US2016/040803, filed on Jul. 1, 2016, and entitled "SYSTEMS AND METHODS FOR VALIDATING TRANSMISSIONS OVER COMMUNICATION CHANNELS," the content each of which is incorporated herein by reference in its entirety.

FIELD

This disclosure relates to systems and methods for validating payment data transmitted in order to complete payment transactions.

BACKGROUND

Electronic payment transactions may be processed by transmitting data from a payment terminal to an authentication host. During transmission, the data may be corrupted due to faults in the payment network. As a result, the authentication host may not receive the expected data and the payment transaction may not be approved as the authentication host may not be capable of validating payment data due to the corrupted data.

Electronic payment transactions may also be targeted for fraudulent transactions. In some instances, fraudulent transactions are detected during authentication by the same authentication failures resulting from a network error. An authentication failure may be the result of fraud, and an authentication failure may also be the result of a network error. However, the authentication systems may be unable to distinguish between network errors and fraudulent transactions.

After authentication failure, the payment network may decide whether to allow the transaction. Despite authentication failure, a transaction with a low fraud risk may still be approved. For example, the payment network may determine that the requested transaction amount is low enough to authorize, despite of the failure. As a result, fraudulent transactions may be authorized in some instances.

SUMMARY

A system, method, and/or computer readable medium (collectively, the "system") is disclosed for authenticating a payment application and payment data involved in a payment transaction. The system receives an authentication Message Authentication Code (MAC), an integrity MAC, and data transmitted from a payment application. A local integrity MAC may be generated using the data as an input to a first cryptographic operation. The system may compare the local integrity MAC to the received integrity MAC to authenticate the received integrity MAC. A local authentication MAC may be generated using a second cryptographic operation and the local authentication MAC may be compared to the received authentication MAC. The system may authenticate the payment application in response to a successful authentication of at least one of the received authentication MAC or the received integrity MAC.

In various embodiments, the system may retrieve an input to the second cryptographic operation that is generated independently from the data used as the input to the first cryptographic operation. In that regard, the input to the authentication MAC may be independent from data transmission failures. The input to the second cryptographic operation may include a date or a transaction counter, for example. The first cryptographic operation may be the same as the second cryptographic operation and may comprise an authentication encryption mode. A transaction may be approved in response to the successful authentication of at least one of the authentication MAC or the integrity MAC. The authentication MAC, the integrity MAC and payment application data may be transmitted from the payment application to a payment terminal. The payment terminal sends, through a payment network and to the processor, all data received from the payment application and other relevant payment terminal transaction data.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The disclosure includes peripherals, devices, systems and networks for validating a payment transaction. A portable device containing a payment application interacts with a payment terminal to perform a payment transaction that may be authorized by an issuer host. The payment application may have a protected Authentication Symmetric Cryptography Key (ASCK). During the payment transaction, the payment application may use the ASCK to compute two Message Authentication Codes (MACs). The first MAC may be computed using as input the payment transaction data, such as transaction amount, date and terminal transaction information, combined with payment application data, such as a payment application transaction counter. The second MAC may be computed using as input any data that can be replicated in the issuer host, regardless of the network message. Both MACs are transmitted to issuer host through the payment network. The issuer host may authenticate the payment application and/or the transaction data separately by validating one or both MACs independently.

Figure 1:
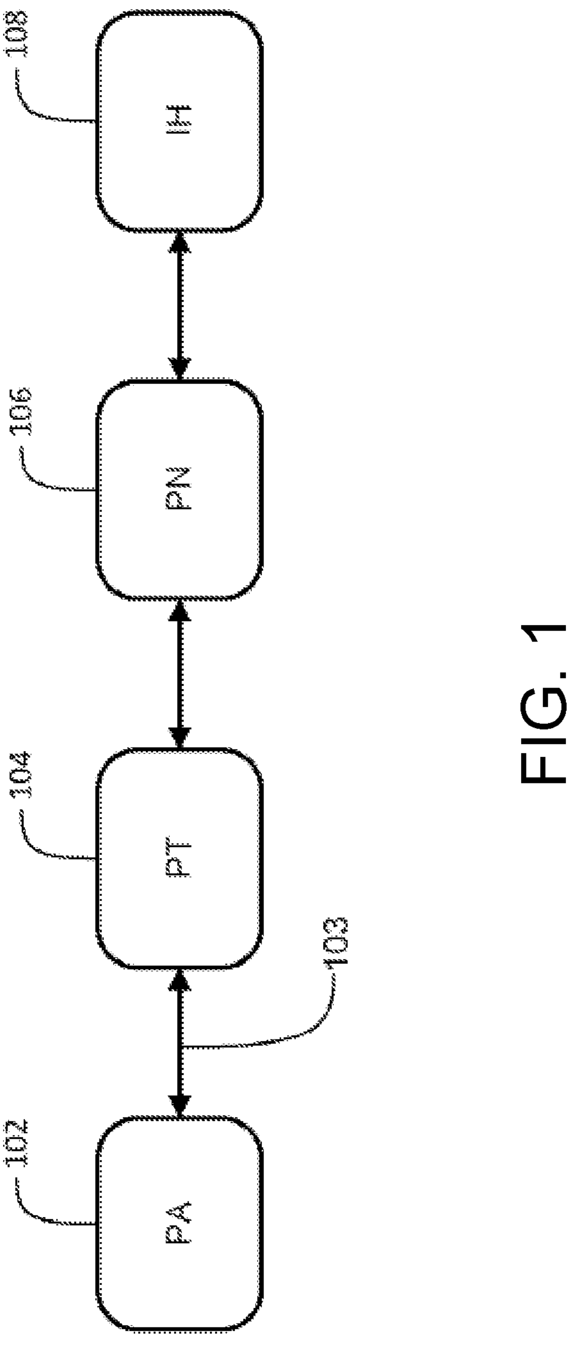
FIG. 1 illustrates an exemplary system for authenticating and validating payment transactions, in accordance with various embodiments.

With reference to FIG. 1, system 100 for completing electronic transactions is shown, in accordance with various embodiments. System 100 facilitates transactions between payment application 102 and point-of-sale (POS) terminal 104. Payment application 102 may be a device capable of performing cryptographic operations and configured to generate two MACs for each transaction. Thus, as described in greater detail herein, a MAC may be an output of a cryptographic function or operation.

A payment application 102 may include a computing device having a processor and memory such as, for example, a computer or set of computers. A payment application 102 may also include other types of computing units or systems such as laptops, notebooks, tablets, hand held computers, personal digital assistants, set-top boxes, workstations, servers, mainframe computers, mini-computers, pervasive computers, network sets of computers, personal computers, kiosks, terminals, televisions, or any other device capable of generating and communicating MACs. Payment application 102 may also include chip cards with a chip configured to generate MACs for authentication.

Payment application 102 may include a software application installed on a computing device or a chip having cryptographic capabilities to generate MACs. The payment application may generate the MACs using an Authentication Symmetric Cryptographic Key (ASCK) to be used as an authentication mechanism. An issuer host 108 may store, or be capable of generating, the same ASCK used by payment application 102 to generate MACs and apply the same cryptographic operations. The cryptographic operations may be performed by way of any of the techniques now available in the art or which may become available such as, for example, 3DES, AES, Twofish, Serpent, Blowfish, CAST5, IDEA, or other suitable symmetric cryptographic operations. Cryptographic operations may also include authentication encryption modes as standardized in ISO/IEC 19772:2009 such as, for example, OCB 2.0, Key Wrap, CCM, EAX, Encrypt-then-MAC (EtM), and GCM. The cryptographic function may take an input including plain text and a key to generate cyphered text. The cryptographic function may be deterministic and/or one-to-one in nature such that the same cyphered text is always generated from the same input. A MAC may have a length of, for example, 4 bytes, 8 bytes, 16 bytes, 32 bytes, or another suitable length.

Payment application 102 may be associated with a transaction account. Transaction data and account data may include an account number or other account information. The account number may be distributed and stored in any form of plastic, electronic, magnetic, radio frequency, wireless, audio and/or optical on payment application 102 capable of transmitting or downloading data from itself to a payment terminal 104.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

The payment terminal 104 may include any of the computing devices discussed herein capable of communication with payment application 102. Payment terminal 104 may communicate with payment application 102 over communication channel 103. Communication channel 103 may include a chip reader, a magnetic stripe reader, an NFC channel, a Bluetooth® channel, an optical communication channel, a local area network (LAN) connection, a wide area network connection (WAN), and/or another communication channel suitable for communicating a MAC from payment application 102 to payment terminal 104.

Payment terminal 104 may transmit two or more MACs for authentication through payment network 106 to issuer host 108. As used herein, "transmit" may include sending electronic data from one system component to another over a network connection. Payment network 106 may include a network of computing devices, as described herein, and communication channels. The MACs may be passed through payment network 106, where transmission errors and/or processing errors may alter a MAC and/or transaction data prior to arrival at issuer host. Issuer host 108 may re-generate the MACs using available data and compare the re-generated MACs to those received from payment application 102, payment terminal 104, and/or payment network 106. Issuer host 108 may successfully authenticate in response to the re-generated MACs matching the received MACs. Issuer host 108 may fail to authenticate in response to the re-generated MACs conflicting with the received MACs. The MACs described herein may be cryptograms resulting from cryptogram operations. Exemplary cryptogram operations include those documented in the EMV 4.3 specification, any transaction specification supported by EMVCo and specified at http://www.emvco.com/specifications.aspx.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Figure 2:
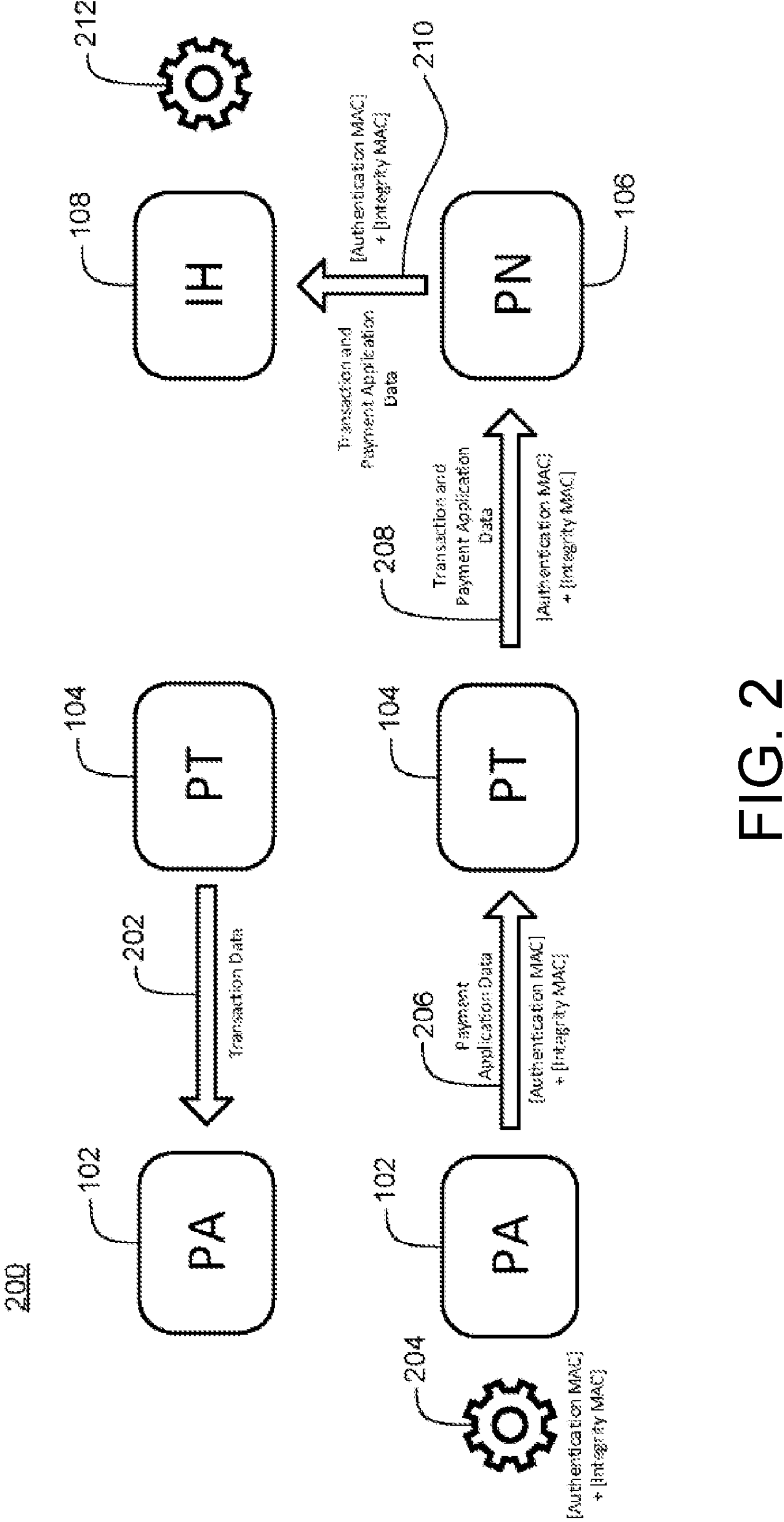
FIG. 2 illustrates an exemplary process for the exchange and validation of authentication data for payment transactions, in accordance with various embodiments.

Referring now to FIG. 2, an exemplary process 200 for authenticating a payment transaction conducted on system 100 is shown, in accordance with various embodiments. Payment application 102 and payment terminal may initiate a payment transaction in which payment application 102 and the associated account is being used to purchase goods or services at payment terminal 104. Payment terminal 104 may transmit transaction data to payment application 102. Transaction data may include a date, a time, a transaction amount, payment terminal 104 data, the type of transaction, and any other data suitable for MAC generation and/or transaction decisioning. Payment terminal 104 data may include a device identifier, a merchant identifier, transaction status, or any other data associated with payment terminal 104.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

Payment application 102 may generate an authentication MAC (AMAC) and an integrity MAC (IMAC) (Step 204). The AMAC and IMAC may each be generated by generated by applying a cryptographic operation to input data. The cryptographic operation may be the same or different for the AMAC and IMAC, provided that the cryptographic operation may be reproduced by the issuer host for comparison and validation. The cryptographic operation may be performed on input data that is also made available at a later time to replicate the AMAC and IMAC by applying the same cryptographic operations. For example, the IMAC may be generated by taking transaction data and account data as an input and applying a cryptographic operation. The AMAC may be generated by taking data that may be available for authentication independent of a transmission from payment application 102. For example, the AMAC may be generated by taking the transaction date and/or transaction time as an input and applying a cryptographic operation. Date and/or time may be available to other entities for use in regenerating the AMAC independently of data transmitted by payment application 102.

The payment application 102 may communicate the AMAC and IMAC each to payment terminal 104 (Step 206). The AMAC and IMAC may be transmitted contemporaneously, for example, in the same authentication packet. In addition to the AMAC and IMAC, payment application 102 may also communicate (in an authentication packet, for example) any other data used as input to generate the IMAC that is stored on and/or generated by the payment application 102. In that regard, by the end of the transaction, payment terminal 104 may have the data necessary for transmission to issuer host 108. Payment terminal 104 may transmit to payment network 106 transaction and/or account data, the AMAC, and the IMAC (Step 208). The transaction and/or account data, the AMAC, and the IMAC may be transmitted through payment network 106 to issuer host 108 (Step 210).

Issuer host 108 may receive the transaction and/or account data, the AMAC, and the IMAC. In order to validate the IMAC, issuer host 108 may generate a local IMAC by applying the same cryptographic steps to the same inputs expected to be used by payment application 102 in Step 204 to generate the IMAC. The local IMAC may be compared to the IMAC received from payment network 106 (and payment application 102). In response to the received IMAC matching the local IMAC, the received IMAC is authenticated successfully. In response to the received IMAC differing from the local IMAC, the IMAC authentication fails.

The AMAC may be used as a secondary authentication tool in response to the IMAC authentication failing. The AMAC may also be used as a secondary authentication tool in addition to the IMAC authentication regardless of the IMAC authentication outcome. In order to validate the AMAC, issuer host 108 may generate a local AMAC by applying the same cryptographic steps to the same inputs expected to be used by payment application 102 in Step 204 to generate the AMAC. The local AMAC may be compared to the AMAC received from payment network 106 (and payment application 102). In response to the received AMAC matching the local AMAC, the received AMAC is authenticated successfully. In response to the received AMAC differing from the local AMAC, the AMAC authentication fails.

By using the IMAC validation and AMAC validation in tandem, issuer host 108 may authenticate payment application 102 despite authentication failure of one of the IMAC or AMAC by validating the other. Thus, network errors causing an authentication failure in one of the MACs may be detected and the transaction may be authorized. Issuer host 108 may also detect a fraudulent or compromised transaction in response to neither the IMAC nor the AMAC successfully authenticating.

Figure 3:
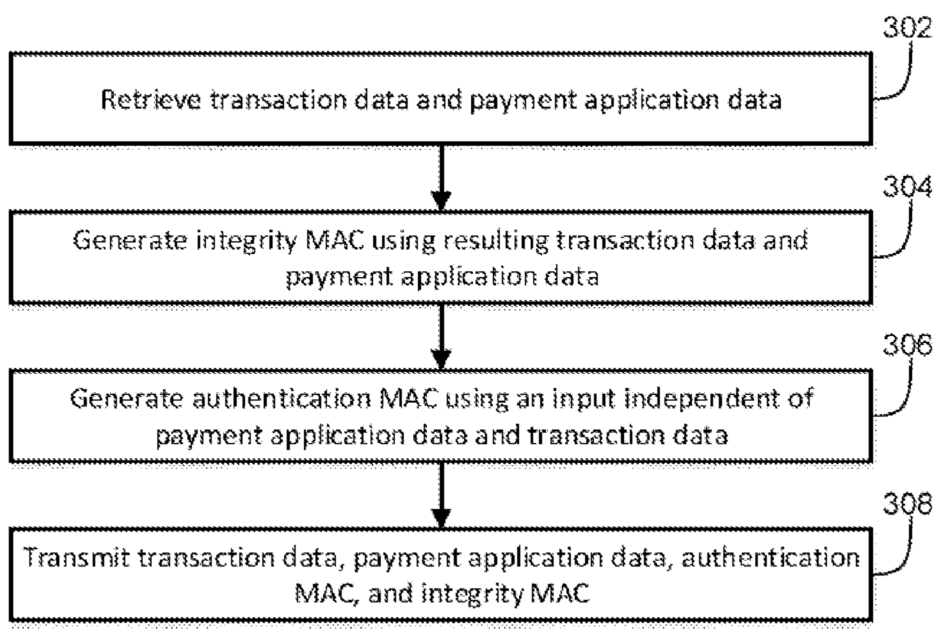
FIG. 3 illustrates an exemplary process for execution by a payment application to generate authentication data for validation, in accordance with various embodiments.

Referring now to FIG. 3, an exemplary process 300 for AMAC and IMAC authentication is shown for execution by payment application 102 and/or payment terminal 104, in accordance with various embodiments. The process may begin with retrieving transaction data and account data (Step 302). The account data may be stored locally on payment application 102 and may include, for example, an account number, a security code, and/or expiration date. Transaction data may be generated, retrieved, and/or stored on payment terminal 104. For example, payment terminal 104 may scan a product and generate transaction data including, for example, a date, time, merchant identifier, and/or transaction amount.

In various embodiments, payment application 102 may generate an IMAC using the resulting transaction data and/or account data (Step 304). The IMAC may be generated, as described herein, by taking transaction data and/or account data as an input and applying a cryptographic operation. The cryptographic operation should be repeatable given an identical input. In that regard, issuer host 108 may reproduce the same IMAC in response to identical transaction data and account data arriving over payment network 106. However, varying input may result in authentication failure since the IMAC generated by issuer host 108 will not match an IMAC generated by payment application 102, if differing input is used for the cryptographic operation.

In various embodiments, payment application 102 may generate an AMAC using an input that is partially or fully independent from account data and/or transaction data (Step 306). The AMAC may be generated, as described herein, by taking an input that may be available independent of transmitted transaction data and account data and applying a cryptographic function. For example, the input may include a date, a time, a transaction counter, a purchase credential, and/or data stored on both payment application 102 and issuer host 108. The cryptographic function may be the same as the cryptographic function used to generate the IMAC. The cryptographic function used to generate the AMAC may also vary from the cryptographic function used to generate the IMAC provided that the cryptographic function used to generate the AMAC generates the same AMAC given the same inputs (i.e., the cryptographic functions are deterministic).

In various embodiments, payment application 102 may transmit the transaction data, the account data, the AMAC, and the IMAC. As described herein, the transmission may go through payment network 106 to issuer host 108. Issuer host 108 may regenerate the AMAC and IMAC using the appropriate inputs and cryptographic functions described herein. The regenerated AMAC and IMAC may be compared to the transmitted AMAC and IMAC, respectively, with a match resulting in successful authentication.

Figure 4:
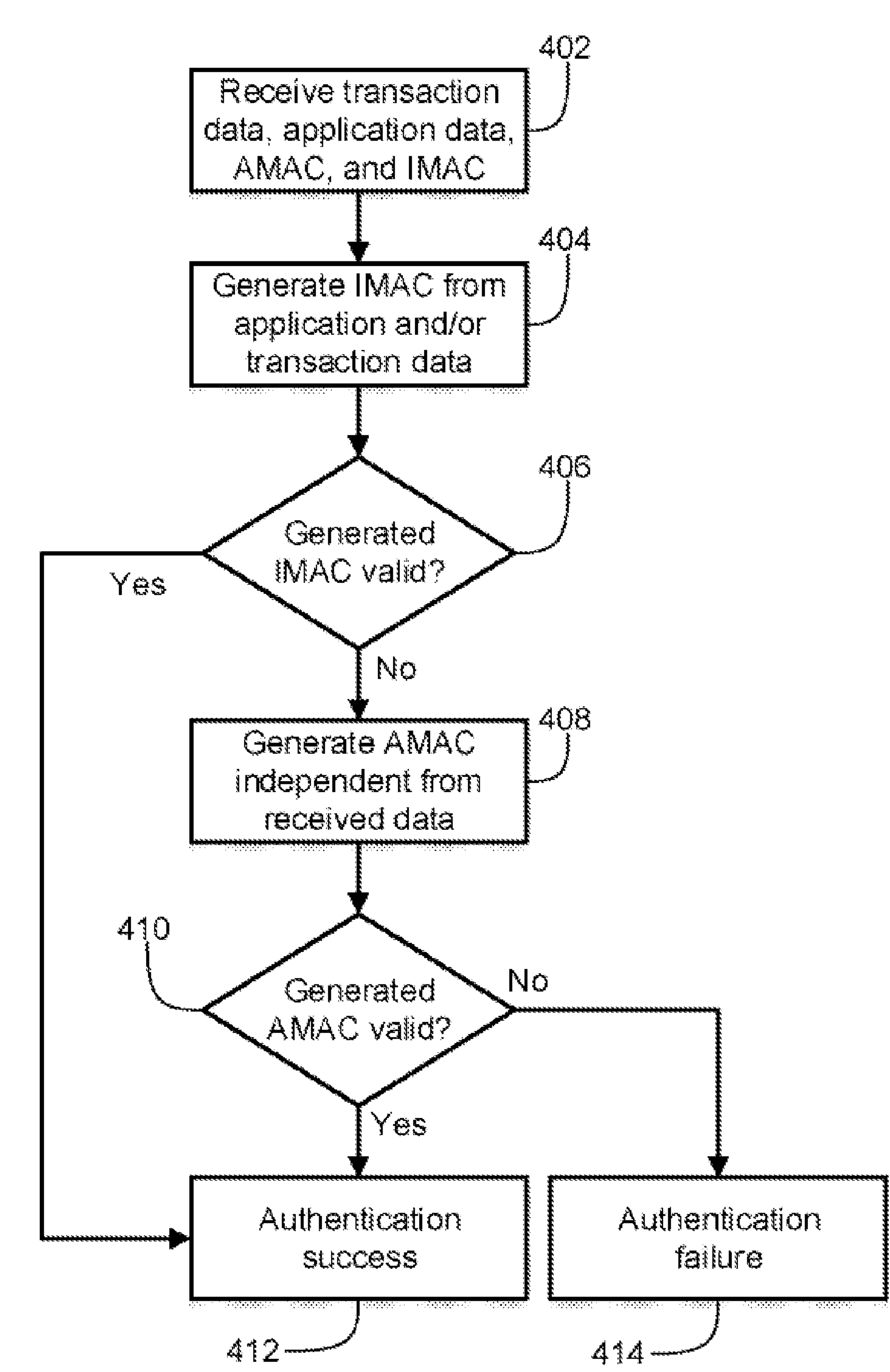
FIG. 4 illustrates an exemplary process for execution by an authenticating system to validate a transmission from a payment application, in accordance with various embodiments.

Referring now to FIG. 4, an exemplary process 400 for authenticating payment application 102 is shown, in accordance with various embodiments. Any authenticating entity may execute process 400 to authenticate payment application 102. For example, issuer host 108 may authenticate payment application 102 using process 400. In various embodiments, issuer host may receive transaction data, account data, AMAC, and IMAC (Step 402). The transaction data and/or payment application data may be received in a transmission from one or more of payment application 102, payment terminal 104, and/or payment network 106.

In various embodiments, issuer host 108 may generate an IMAC from account data and/or transaction data (Step 404). As described herein, account data and/or transaction data received from payment application 102 may be used as an input to a cryptographic operation. The cryptographic operation may result in a locally generated IMAC for comparison to the IMAC received in Step 402. In various embodiments, issuer host 108 may determine whether the generated IMAC is valid (Step 406). Issuer host may make the determination by comparing the generated IMAC from Step 404 to the IMAC received in step 402. If the IMACs match then the generated IMAC is valid, and authentication is successful (Step 412).

In various embodiments, issuer host 108 may generate an AMAC independently from data received (Step 408) in response to the IMACs not matching. The AMAC may be generated using input that does not contain data received in Step 402. That is, data used as input to generate the AMAC at issuer host 108 may be stored, generated, or otherwise retrieved by AMAC independently of the transmission received in Step 402. Independent data may include a date, time, transaction counter, or transaction credential stored or retrieved by issuer host 108. Thus, although transaction data includes a transaction date, for example, issuer host may regenerate the date upon receiving the transmission in Step 402 rather than reading the transaction date from the transmission. The regenerated date may be used in generating the AMAC, as the regenerated date is independently generated by issuer host 108.

In various embodiments, issuer host 108 may determine whether the generated AMAC is valid (Step 410). Issuer host may make the determination by comparing the generated AMAC from Step 408 to the AMAC received in step 402. If the AMACs match then the generated AMAC is valid, and authentication is successful (Step 412). If the AMACs do not match then the generated AMAC is invalid, and authentication is a failure (Step 414). Issuer host may approve a transaction in response to authentication success with a heightened level of confidence that the transaction is not fraudulent. Issuer host may also decline a transaction in response to authentication failure with a heightened level of confidence that the transaction is fraudulent.

Authentication systems and methods of the present disclosure may result in fewer disputed transactions due to the improved accuracy and robustness of the multiple-MAC authentication technique. The systems may decrease the approval rate of fraudulent payment transactions due to the granular authentication being performed. As a result, authenticators may experience a reduced fraud risk and devote fewer internal resources to investigate fraudulent transactions.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is redirected to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the particular machines described herein, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, and optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); JAVA® 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VB Script, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g. , systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

In yet another embodiment, payment application 102 is configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

The payment application 102 may include or interface with any of the foregoing devices and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481 / ECMA-352, Near Field Communication Interface and Protocol-2 (NFCIP-2); and EMV 4.3 available at http://www.emvco.com/default.aspex.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, and C" or "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:

retrieving, at a payment application device, transaction data from a point-of-sale (POS) terminal relating to a transaction;

generating, at the payment application device, a first cryptographic code by applying a first cryptographic function to the transaction data and to account data corresponding to the payment application device;

generating, at the payment application device, a second cryptographic code by applying a second cryptographic function to second data that is available to an issuer host system without being transmitted from the payment application device; and transmitting the transaction data, the account data, the first cryptographic code, and the second cryptographic code to the issuer host system for authentication of the payment application device;

determining, by the issuer host system, that the transmitted first cryptographic code fails to match a local first cryptographic code by comparing the local first cryptographic code to the transmitted first cryptographic code;

in response to the determining:

retrieving, by the issuer host system, the second data for input to the second cryptographic function, wherein the second data is generated independently from the transaction data received from the payment application device;

generating, by the issuer host system, a local second cryptographic code using the second cryptographic function;

authenticating, by the issuer host system, the transmitted second cryptographic code by comparing the local second cryptographic code to the transmitted second cryptographic code;

determining, based on the comparing, whether the local second cryptographic code matches the transmitted second cryptographic code; and authenticating, by the issuer host system, the transaction in response to the transmitted second cryptographic code matching the local second cryptographic code, and denying the transaction in response to the transmitted second cryptographic code failing to match the local second cryptographic code;

receiving, at the payment application device, a reply message from the issuer host system in response to the transmitting, wherein the reply message indicates authentication of only one of the first cryptographic code or the second cryptographic code; and completing or terminating the transaction, by the payment application device, based on the reply message.

2. The method of claim 1, wherein the first cryptographic code is an integrity Message Authentication Code (MAC) and wherein the second cryptographic code is an authentication Message Authentication Code (MAC).

3. The method of claim 1, wherein the transaction data includes an identifier of a product that has been scanned for purchase.

4. The method of claim 1, wherein the second data includes data obtained by the issuer host system independently from the transaction data received from the payment application device.

5. The method of claim 1, wherein the second data includes a transaction counter.

6. The method of claim 1, wherein the first cryptographic function and the second cryptographic function apply symmetric cryptographic operations.

7. The method of claim 1, wherein the payment application device is a chip card configured to generate Message Authentication Codes (MACs).

8. A payment application system comprising:
a memory; and
at least one processor coupled to the memory and configured to:
retrieve transaction data from a point-of-sale (POS) terminal relating to a transaction;
generate a first cryptographic code by applying a first cryptographic function to the transaction data and to account data corresponding to the payment application system, the transaction data including a payment amount associated with the transaction;
generate a second cryptographic code by applying a second cryptographic function to second data that is available to an issuer host system without being transmitted from the payment application system;
transmit the transaction data, the account data, the first cryptographic code, and the second cryptographic code to the issuer host system for authentication of the payment application system;
determine, by the issuer host system, that the transmitted first cryptographic code fails to match a local first cryptographic code by comparing the local first cryptographic code to the transmitted first cryptographic code;
in response to the determining:
retrieve the second data for input to the second cryptographic function, wherein the second data is generated independently from the transaction data;
generate a local second cryptographic code using the second cryptographic function;
authenticate the transmitted second cryptographic code by comparing the local second cryptographic code to the transmitted second cryptographic code;
determine, based on the comparing, whether the local second cryptographic code matches the transmitted second cryptographic code; and
authenticate the transaction in response to the transmitted second cryptographic code matching the local second cryptographic code, and denying the transaction in response to the transmitted second cryptographic code failing to match the local second cryptographic code;
receive a reply message from the issuer host system in response to the transmitting, wherein the reply message indicates authentication of only one of the first cryptographic code or the second cryptographic code; and
complete or terminate the transaction based on the reply message.

9. The payment application system of claim 8, further comprising a transponder configured to retrieve the transaction data from the point-of-sale (POS) terminal via a near field communication (NFC) channel.

10. The payment application system of claim 8, wherein the first cryptographic code is an integrity Message Authentication Code (MAC) and wherein the second cryptographic code is an authentication Message Authentication Code (MAC).

11. The payment application system of claim 8, wherein the transaction data includes an identifier of a product that has been scanned for purchase.

12. The payment application system of claim 8, wherein the second data includes data obtained by the issuer host system independently from the transaction data received from the payment application system.

13. The payment application system of claim 8, wherein the second data includes a transaction counter.

14. The payment application system of claim 8, wherein the first cryptographic function and the second cryptographic function apply symmetric cryptographic operations.

* * * * *